United States Patent
Witzell

[15] 3,659,257
[45] Apr. 25, 1972

[54] CONTINUOUS MAGNETIC LINE HYDROPHONE

[72] Inventor: Warren E. Witzell, Woods Hole, Mass.

[73] Assignee: Woods Hole Oceanographic Institution, Woods Hole, Mass.

[22] Filed: Nov. 4, 1968

[21] Appl. No.: 773,700

[52] U.S. Cl. ..................................340/8, 181/5 R, 340/7, 340/17
[51] Int. Cl. .........................................G01v 1/16, H04r 9/00
[58] Field of Search ..............................340/7, 17, 8; 181/.5

[56] References Cited

UNITED STATES PATENTS

| 1,584,613 | 5/1926 | Comstock et al. | 340/7 |
| 2,581,091 | 1/1952 | Foster | 340/17 |
| 2,649,579 | 8/1953 | Alexander | 340/17 X |
| 2,807,793 | 9/1957 | Bayhi | 340/17 |
| 2,965,877 | 12/1960 | Stein et al. | 340/17 X |
| 3,317,891 | 5/1967 | Bradley | 340/17 |
| 3,375,490 | 3/1968 | Stubblefield | 340/17 |

*Primary Examiner*—Richard A. Farley
*Assistant Examiner*—Robert Kinberg
*Attorney*—Kenway, Jenney & Hildreth

[57] ABSTRACT

A true continuous line hydrophone is constructed with an elongated resilient permanent magnet having its polar axis at right angles to the principal dimension of the line. A coil conductor is wrapped longitudinally about the magnet in such manner that laterally impinging acoustic waves alter the position of the coil relative to the magnetic field, thereby creating an electrical signal.

8 Claims, 5 Drawing Figures

PATENTED APR 25 1972 3,659,257

INVENTOR.
WARREN E. WITZELL
BY Kenway Jenney
+ Hildreth
ATTORNEYS 3,659,257

CONTINUOUS MAGNETIC LINE HYDROPHONE

BACKGROUND OF THE INVENTION

The field of this invention generally comprises hydrophones useful in conducting hydrographic and geophysical surveys, or as submarine detection means, and for related uses. More particularly, the invention concerns continuous line hydrophones having sensitivity distributed substantially uniformly throughout an extended principal dimension or length, as contrasted to arrays of discrete hydrophones, whether interconnected in series or parallel.

The copending application of Knott, Hess and Nowak Ser. No. 576,979 filed Sept. 2, 1966, describes a continuous line transducer operating on principles of variable capacitance. As pointed out therein, certain advantages result from using a continuous type transducer, particularly with regard to its sensitivity pattern which has a major lobe of substantially greater sensitivity than any minor lobe regardless of frequency. This minimizes ambiguities and unwanted signals occuring at various angles of incidence to that of the major lobe and at various frequencies, particularly in broadband applications such as sub-bottom profiling as described more specifically in U.S. Pat. No. 3,065,815 to Hersey and Knott. For this purpose the angle of incidence is defined as the angle between the direction of wave propagation toward the line and the plane normal to the longitudinal axis of the line.

The U.S. Pat. to Foster No. 2,581,091 describes a continuous line seismometer of the electromagnetic type constructed with an elongated central conductor carrying a direct current of considerable magnitude and thereby producing a magnetic field. A coil of wire is wrapped longitudinally about this conductor in such manner that laterally impinging acoustic waves alter the position of the coil relative to the magnetic field, thereby creating an electrical signal. The device described in this patent has certain disadvantages. It depends on making high current connections to both ends of the line, and conducting the return current through a feeder line sufficiently remote from the line seismometer so that its induced magnetic field will not alter the field of the seismometer. This makes it difficult to tow the line behind a ship, which is a preferred method of deployment for sub-bottom profiling, for example. A further disadvantage is the high specific gravity of the line due to the copper or other metal in the central conductor, which means that the line may not be neutrally buoyant. Still further, the entire device is rendered inoperative by any break in the current circuit of the central conductor or its end connections. Such breaks may sometimes occur when the line is reeled on to or off of a cable drum or sheave in the towing vessel, or when the line is sharply bent in any other manner.

SUMMARY OF THE INVENTION

This invention includes the use of an elongated permanent magnet having its polar axis or north-south pole direction at right angles to the length or principal dimension of the line. This type of magnet produces a different pattern of magnetic lines of force than the circular field of the Foster patent, but one in which wires of a longitudinally wound coil may be oscillated to produce a strong output signal. It is unnecessary to employ heavy current connections to either end of the transducer, hence it may be readily towed. It may also be rendered neutrally buoyant by a suitable choice of materials.

A further advantage arises from the fact that the performance of the transducer is not materially affected by breaks in the permanent magnet. Still other advantages result from the possibilities for modification of the structure to reduce sensitivity to noise signals, and to changes in the environmental pressure on the line, such as exists when it is used in a submerged position.

BRIEF DESCRIPTION OF THE PREFERRED EMBODIMENTS

Figure 1:
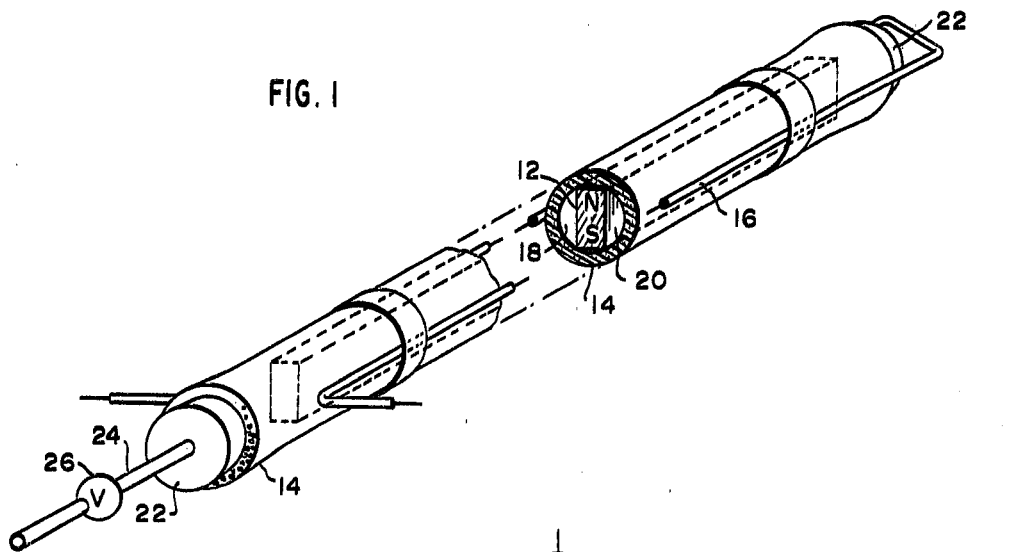
FIG. 1 is a view in perspective of one form of the invention, partially broken away to show the cross-section.

Referring to FIG. 1, a permanent magnet 12 in the form of an elongated bar of generally rectangular cross-section is supported inside a generally cylindrical rubber hose-like tube 14. This tube is preferably waterproof and non-conducting. A copper wire loop 16 is wound longitudinally about the tube and may be secured to its outside surface by suitable means such as adhesive or adhesive coated tape. The magnet is preferably formed of a commercially available flexible, rubber-like magnetic material. A suitable material is sold under the trademark "Ferro-Flex" by The Chemical Rubber Company, 2310 Superior Avenue, Cleveland, Ohio 44114. The tube 14 provides a seal excluding water from inner spaces 18 and 20 at the sides of the magnet. It is sufficiently flexible to permit the wire 16 to vibrate radially and thereby to cut lines of magnetic force produced by the magnet when acoustic waves impinge from directions having components radial to the tube. To this end the tube is preferably fabricated of a closed cellular plastic foam material such as cellular vinyl chloride or polyurethane, although it will be apparent that other substituents are suitable.

The north-south pole direction is at right angles to the length of the line, and as viewed in cross section, this produces mirror-image patterns of lines of magnetic force with respect to a line having this direction. These lines of magnetic force intersect at right angles the wire loop 16 which lies in a plane normal to the line of symmetry. Described in other terms, the planes of the magnetic axis and the loop 16 are orthogonal and both include the axis of the tube.

With the foregoing structure, it is apparent that a sound wave, such as that generated by a spark, explosive or impact-type sound source, if containing a directional component normal to the tube or line axis, causes radial movement of the wires of the loop, whereby they will cut lines of magnetic force and generate an electrical signal.

Figure 2:
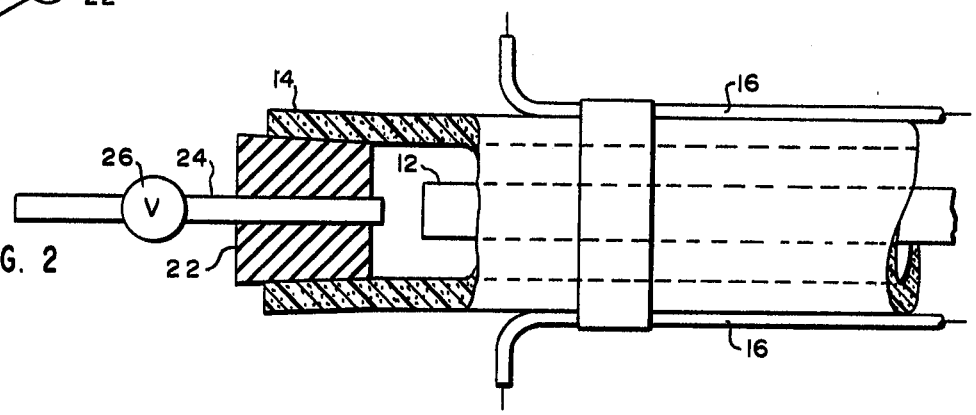
FIG. 2 is a longitudinal sectional elevation of one end of the device shown in FIG. 1.

The transducer of FIG. 1 may be of any desired length up to several hundreds of feet. The uniformity of the cross section of the magnet and tube permits the use of methods of fabricating continuous lengths, for example by extrusion. The ends of the tube are suitably closed or plugged in any desired manner if it is desired to exclude water from the spaces 18 and 20. This is ordinarily desirable since air or other gas is compressible and permits a greater amplitude of movement of the loop. The form shown in FIG. 2 is a rubber plug 22.

If the device is to be used at depth in the water, the spaces 18 and 20 within the tube may be pressurized. This is conveniently done by means of a fill tube 24 which is connected with a source of air or other gas under pressure through a valve 26.

Although only a single loop of wire 16 is shown in FIG. 1, it is apparent that multiple turns may be employed to increase sensitivity. The wire may be wrapped about the ends of the magnet or it may be threaded through transverse holes or bent and wrapped annularly about the tube near its ends or at any desired longitudinal position. These latter methods may be preferred as means of avoiding interference with the end closures or plugs and seals. In any case, the multiple turns are mutually insulated as by using an insulated wire, as well as being insulated from the environment which may be electrolytic as in the case of salt water.

Figure 3:
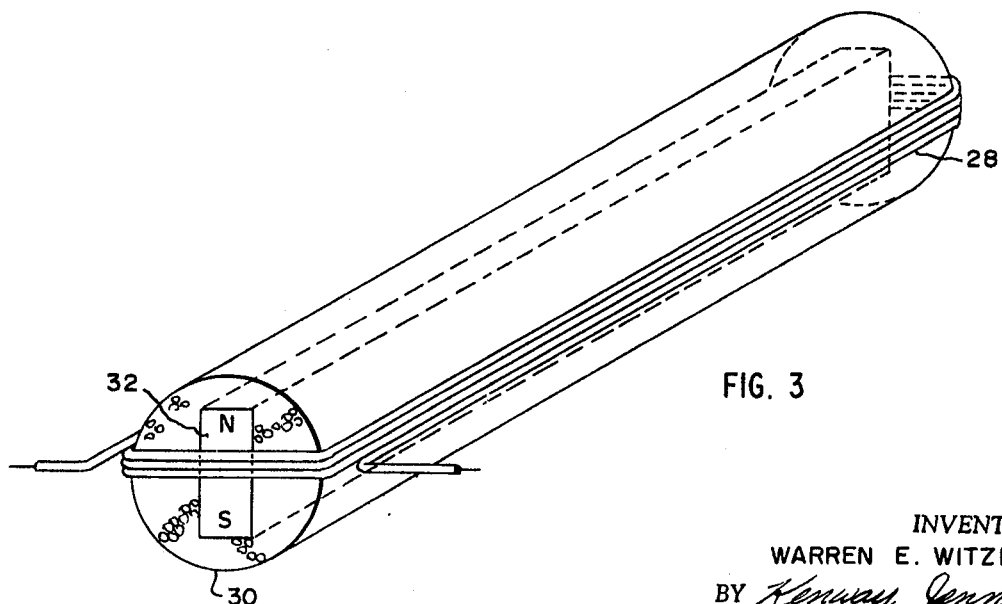
FIG. 3 is a similar view of a second form.

FIG. 3 shows a second form of the transducer in which a coil 28 of insulated wire is wound longitudinally about a cylindrical shaped body 30 of a closed cellular foam material which may be similar to the tube 14. This body is extrusion molded about a flexible magnet 32 similar to the magnet 12. The body 30 preferably has closed cells if exposed to the environment as shown, or it may have open cells by protecting its exterior surface with a thin, flexible and impervious outer plastic or rubber covering of a suitable type. When used, this covering may also cover the coil 28 and thereby protect it. In any case, the cells in the body 30 contain gas and provide the compressibility necessary to permit vibrating movement of the wires in the coil 28.

Figure 4:
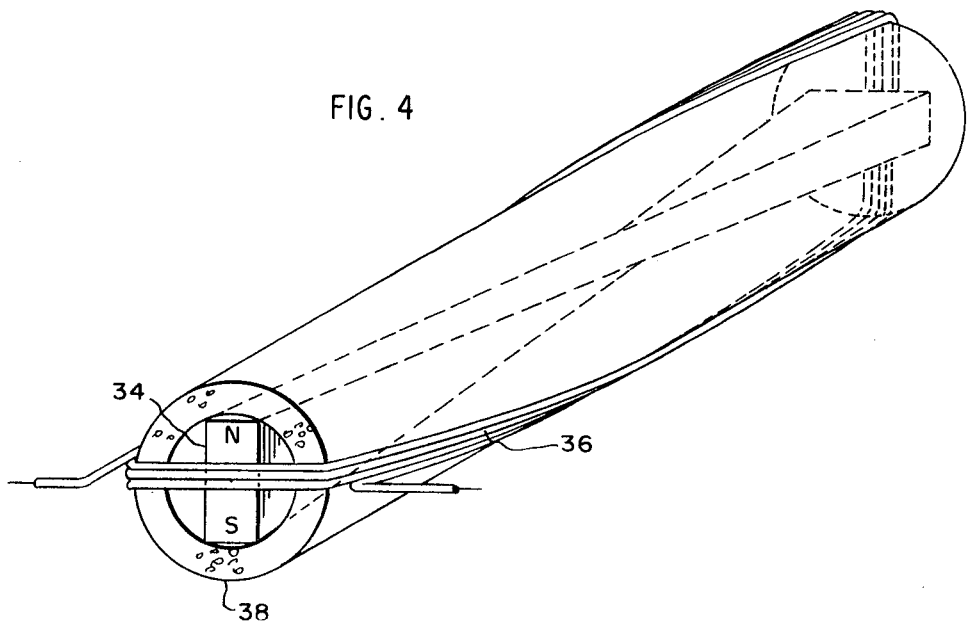
FIG. 4 is a similar view of a third form.

FIG. 4 shows a variant of the construction of FIG. 3 adapted to suppress spurious electromagnetic pickup. In this case the line is progressively twisted as it is being formed, whereby the magnet 34 and the coil 36 are given a helical twist. As a result the direction of the major sensitivity lobe progresses in a helical manner along the line and any unwanted signal that impinges on the line from a source generally axial to it, such as 60-cycle vibration from the propulsion machinery in the towing vessel, tends to be cancelled out. In this embodiment the body 38 is similar to the tube 14, or may be made like the body 30.

Figure 5:
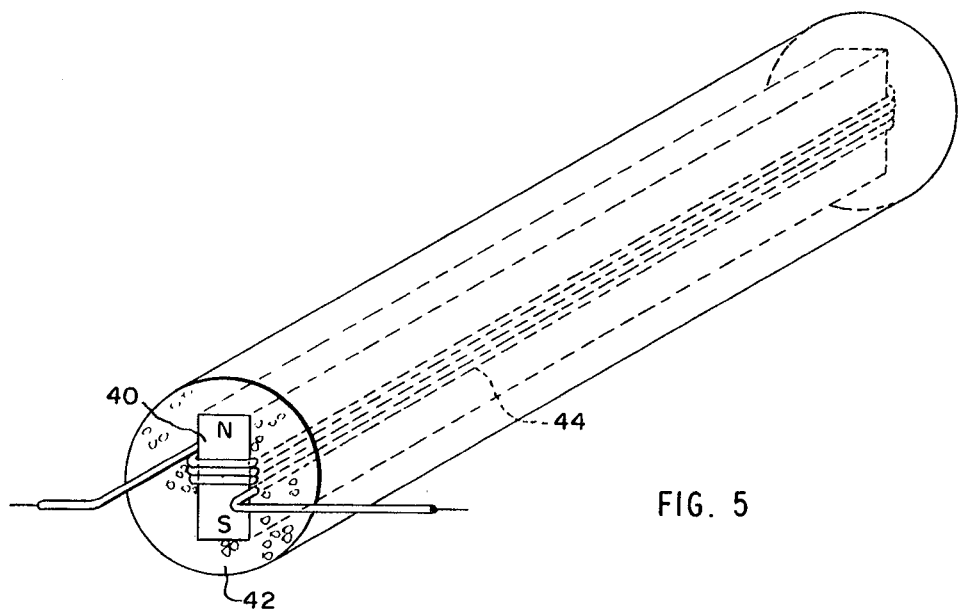
FIG. 5 is a similar view of a fourth form.

The embodiment of FIG. 5 has a magnet 40 and a body 42 similar to the corresponding parts in FIG. 3 but a coil 44 is wrapped directly around the magnet and embedded in the body 42. In this case the rubber-like resiliency of the magnet itself permits sufficient motion of the coil 44 in response to incoming signals to generate the output voltage.

In all of the embodiments discussed, the magnets and surrounding tubes or bodies are flexible and this permits them to be flexed and bent over sheaves. However, if the magnet should be broken at any place along its length, this will not materially affect the magnetic field as a whole and the line hydrophone continues to be serviceable.

Also, the choice of materials and dimensions permitted by this invention renders it readily feasible to have a neutrally buoyant line. This is an advantage in many applications where the line is trailed at or near the water surface by a ship as described in said patents.

It will be apparent to one skilled in this art that a plurality of lines of the type herein described may be arrayed in various configurations and so connected as to permit "steering," that is, varying the total sensitivity as a function of the relative strength of the signals received by the individual lines. Also, the sensitivity may be increased or decreased by varying the number of turns on any line.

Other configurations and embodiments will also occur to those skilled in this art. In any case, the coil leads are preferably brought out at one end of the line and connected to suitable filters and amplifiers associated with standard recording equipment such as a magnetic tape recorder or a graphic recorder. These adaptations of the teachings herein are also within the spirit and scope of this invention.

I claim:

1. A magnetic line transducer having, in combination,
   an elongated permanent magnet having its polar axis transverse to its principal dimension,
   a body of flexible, resilient material surrounding and supporting the magnet, and
   a conductor coiled longitudinally about the magnet in position to cut lines of magnetic force induced by the magnet when the coil is vibrated by impinging sound waves.

2. The combination according to claim 1, in which the permanent magnet is constructed of flexible and resilient material.

3. The combination according to claim 1, in which the coil is supported by said body in position to vibrate in relation to the magnet in response to the pressure of impinging sound waves.

4. The combination according to claim 3, in which the coil is imbedded in said body.

5. The combination according to claim 1, in which said body is a hollow waterproof tube sealed at its ends.

6. The combination according to claim 5, in which the tube is filled with gas under pressure.

7. The combination according to claim 1, in which said body is a cellular foam material molded around and in closely surrounding relationship to the magnet.

8. The combination according to claim 1, in which the coil and magnet are twisted about the principal axis of the transducer.

* * * * *